United States Patent
Kawabata et al.

(10) Patent No.: US 7,818,516 B2
(45) Date of Patent: Oct. 19, 2010

(54) MEMORY CONTROLLER, SEMICONDUCTOR MEMORY, AND MEMORY SYSTEM

(75) Inventors: Kuninori Kawabata, Kawasaki (JP); Satoshi Eto, Kawasaki (JP); Toshiya Miyo, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 237 days.

(21) Appl. No.: 11/442,576

(22) Filed: May 30, 2006

(65) Prior Publication Data

US 2007/0180202 A1  Aug. 2, 2007

(30) Foreign Application Priority Data

Jan. 30, 2006  (JP)  ............................ 2006-021338

(51) Int. Cl.
*G06F 13/00*  (2006.01)
(52) U.S. Cl. ........................ 711/154; 711/200; 711/202
(58) Field of Classification Search ................. 711/154, 711/200, 202

See application file for complete search history.

(56) References Cited

U.S. PATENT DOCUMENTS

| 5,553,025 | A  | * | 9/1996  | Haraguchi     | 365/201 |
|-----------|----|---|---------|---------------|---------|
| 6,469,703 | B1 | * | 10/2002 | Aleksic et al.| 345/542 |
| 2001/0024386 | A1 | * | 9/2001 | Harari et al. | 365/200 |
| 2001/0047438 | A1 | * | 11/2001 | Forin        | 710/18  |
| 2003/0085731 | A1 | * | 5/2003 | Iwase et al.  | 326/16  |
| 2003/0097533 | A1 | * | 5/2003 | Maeda et al.  | 711/162 |
| 2004/0083334 | A1 | * | 4/2004 | Chang et al.  | 711/103 |

FOREIGN PATENT DOCUMENTS

JP  7-092242 A  4/1995

* cited by examiner

*Primary Examiner*—Stephen C Elmore
*Assistant Examiner*—Jae U Yu
(74) *Attorney, Agent, or Firm*—Fujitsu Patent Center

(57) ABSTRACT

A memory controller connected to memory includes: an address reception unit for receiving an address code externally input together with a command; and a command conversion unit for outputting to the memory an MRS command to change the internal settings of the memory based on the address code when the address code input together with a first command specifies an address space for which the memory is not implemented.

4 Claims, 12 Drawing Sheets

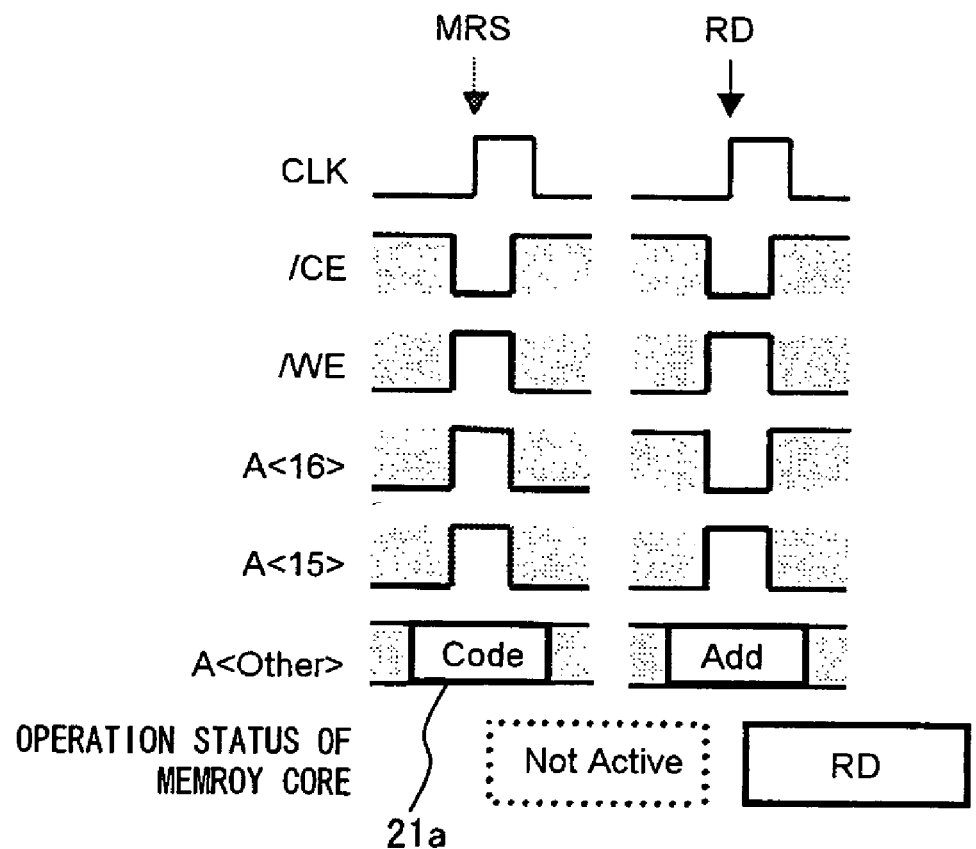
F I G. 2

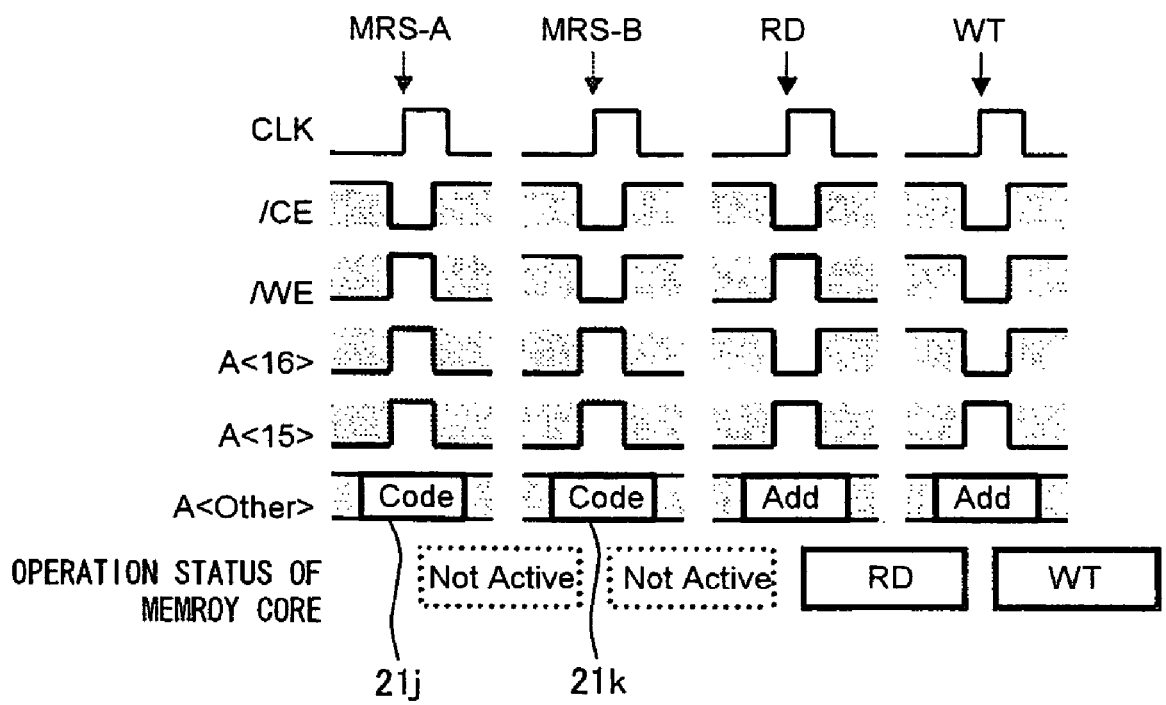
F I G. 7

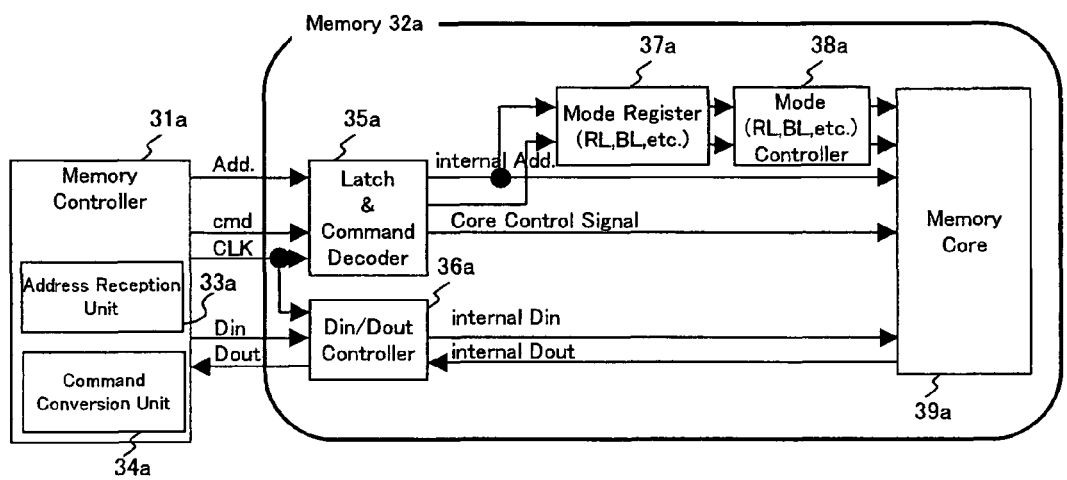
F I G. 8

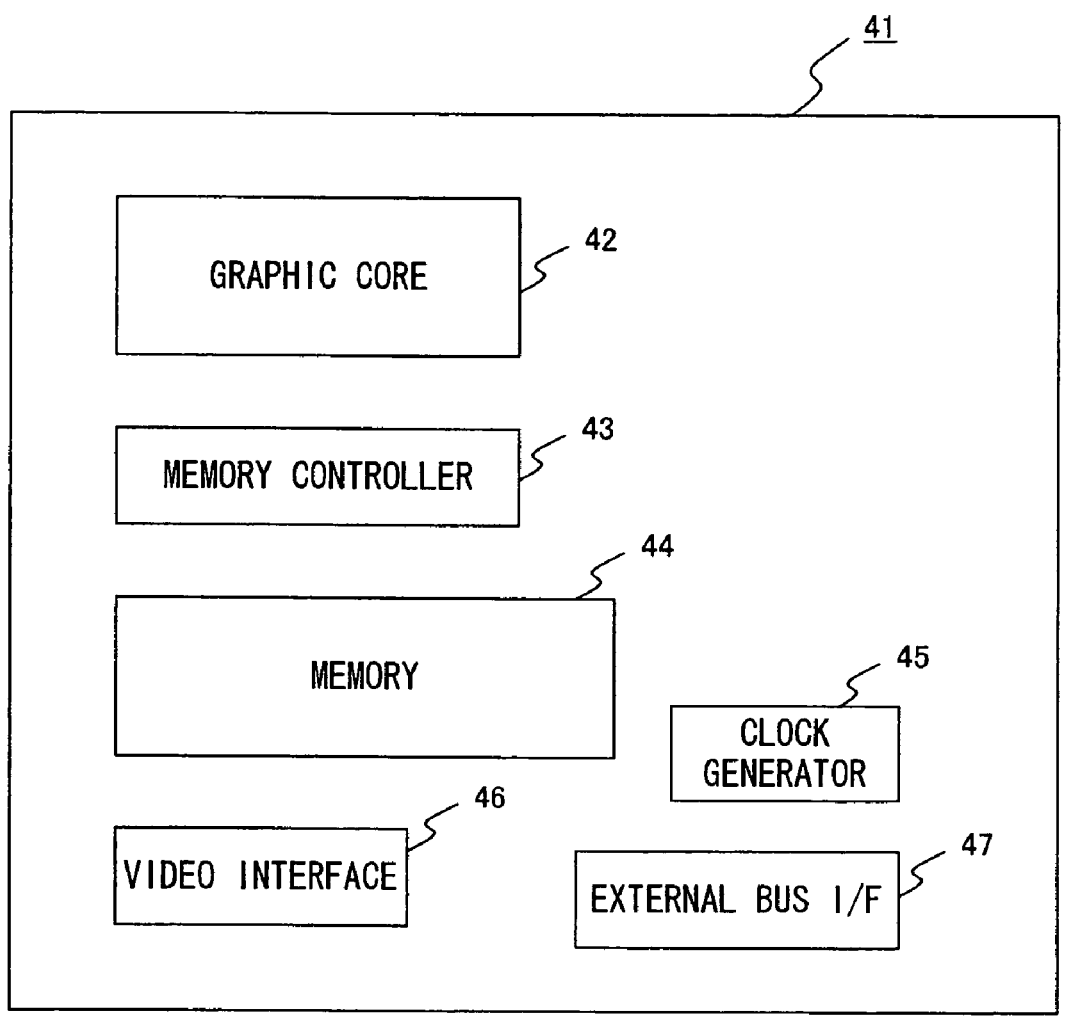
F I G. 1 2

MEMORY CONTROLLER, SEMICONDUCTOR MEMORY, AND MEMORY SYSTEM

CROSS-REFERENCE TO RELATED APPLICATIONS

This application is based upon and claims the benefit of priority from the prior Japanese Patent Application No. 2006-021338 filed on Jan. 30, 2006, the entire contents of which are incorporated herein by reference.

BACKGROUND OF THE INVENTION

1. Field of the Invention

The present invention relates to a semiconductor memory and a memory system in which internal settings can be changed.

2. Description of the Related Art

Generally, a semiconductor integrated circuit including semiconductor memory conducts a function test upon completion of a product, etc. Therefore, it is necessary to change various internal settings. Furthermore, it is desired for semiconductor memory, etc. that various internal settings such as a BL (burst length) and RL (read latency), etc. depending on the used style and needs.

However, the semiconductor integrated circuit is requested to reduce the number of external terminals with the with recent higher integration and finer circuit patterns of the circuits, there is the tendency that no special external terminals are provided for the input of a signal in conducting a test or setting various operation modes. Therefore, a number of devices are proposed to change various settings without providing exclusive terminals.

For example, a common semiconductor memory is provided with a register for switching operation modes, and the operation mode is changed by externally and electrically rewriting the register information. In many cases, rewriting a register is performed by inputting an illegal command, which is different from normally used commands such as an RD command, a WT command, a Ref command, etc. plural times.

The patent document 1 (Japanese Published Patent Application No. H7-92242) discloses the configuration of assigning a specific address value for mode settings, and writing data to the address value, thereby changing a set value.

As described above, the configuration of changing the settings by enabling a normally illegal command when an operation mode is set, or the configuration of changing the settings of memory by writing data to a specific address value as for the memory described in the patent document 1 are complicated in designing a memory system.

SUMMARY OF THE INVENTION

In light of the above-mentioned points, the present invention aims at providing a memory system capable of changing the internal settings of memory by a simple procedure, and having simple circuit configuration Especially, the present invention aims at providing a simple memory system capable of setting an operation mode when memory is used using an address code as in the memory system in which an image is processed and when real memory is not implemented and there are unused addresses in the address space specified by address input assigned to the memory from a memory controller.

The memory controller according to the present invention is connected to memory, and includes an address reception unit and a command conversion unit.

The address reception unit receives an address code external input together with a command.

When the address code input together with the first command designates an address space for which the memory is not implemented, the command conversion unit outputs to the memory an MRS command directing a change of the internal settings of the memory based on the address code.

With the configuration, the internal settings of memory can be changed only by setting the value of an address code combined with an address code.

The command conversion unit can be designed to output an MRS command to the memory when the first command is first input together with the address code specifying the address space for which the memory is not implemented after power-up, after resetting initialization, or after recovery from low-power standby.

Otherwise, the command conversion unit can be designed to output to memory an MRS command designating a change of the internal settings of the memory when the address code input together with the first command specifies an address space for which the memory is not implemented until the address code specifying an address space for which the memory is implemented is input with the command after power-up, after resetting initialization, or after recovery from low-power standby.

Furthermore, the command conversion unit can be designed to output to memory an MRS command specifying a change of internal settings of the memory when the address code input together with the first command specifies the address space for which the memory is not implemented until a write command is input after power-up, after resetting initialization, or after recovery from low-power standby.

With the above-mentioned configuration, since the period in which an MRS command is output is limited, internal settings of memory can be prevented from being erroneously performed.

The command conversion unit can be designed to output an MRS command to memory when the first command is input N times (N is a natural number equal to or larger than 2) continuously together with the address code specifying an address space for which the memory is not implemented.

With the configuration, the internal settings can be more successfully prevented from being erroneously performed.

Furthermore, the command conversion unit can be designed to output an MRS command to memory when the address code input together the first N−1 times is a predetermined value in the first commands input N times continuously.

With the configuration, the internal settings can be more successfully prevented from being erroneously set.

The command conversion unit can be designed to output to memory an MRS command specifying a change of internal settings of the memory when the address code input together with a second command different from the first command specifies an address space for which the memory is not implemented.

With the configuration, more internal settings can be changed.

Furthermore, the present invention includes in its scope not only a memory controller, but also semiconductor memory and a memory system.

According to the present invention, the operation settings can be changed by an address code for which only address input is determined using the same command input as in the normal operation.

Therefore, since the configuration for changing the operation settings can be constituted using the operation/configuration of normal memory access, the circuit configuration can be simple.

Furthermore, since settings can be changed by specifying only an address code without using a data code, the circuit configuration can be simpler than in the conventional technology.

BRIEF DESCRIPTION OF THE DRAWINGS

FIG. 2 shows the status of each input terminal when an MRS command and an RD command are input;

FIG. 7 shows the fifth method for preventing erroneous settings by an MRS command;

FIG. 8 shows an example of the configuration of the memory system according to an embodiment of the present embodiment;

FIG. 12 shows an example of the configuration of the graphic controller.

DESCRIPTION OF THE PREFERRED EMBODIMENTS

A memory space my semiconductor memory used in the memory system according to an embodiment of the present invention is first explained below.

In many cases, the semiconductor memory used for an image, etc. is assigned not some power of 2, but an address space of a multiple of 3, for example, 96 k word×32 bit (3M bit). In this case, the address space of the remaining ¼ as shown in FIG. 1 is not used.

According to an embodiment of the present invention, using the address value of the unused address space, the internal settings of the semiconductor memory such as BL (burst-length), RL (read-latency), WL (write-latency), etc., are changed.

Figure 1:
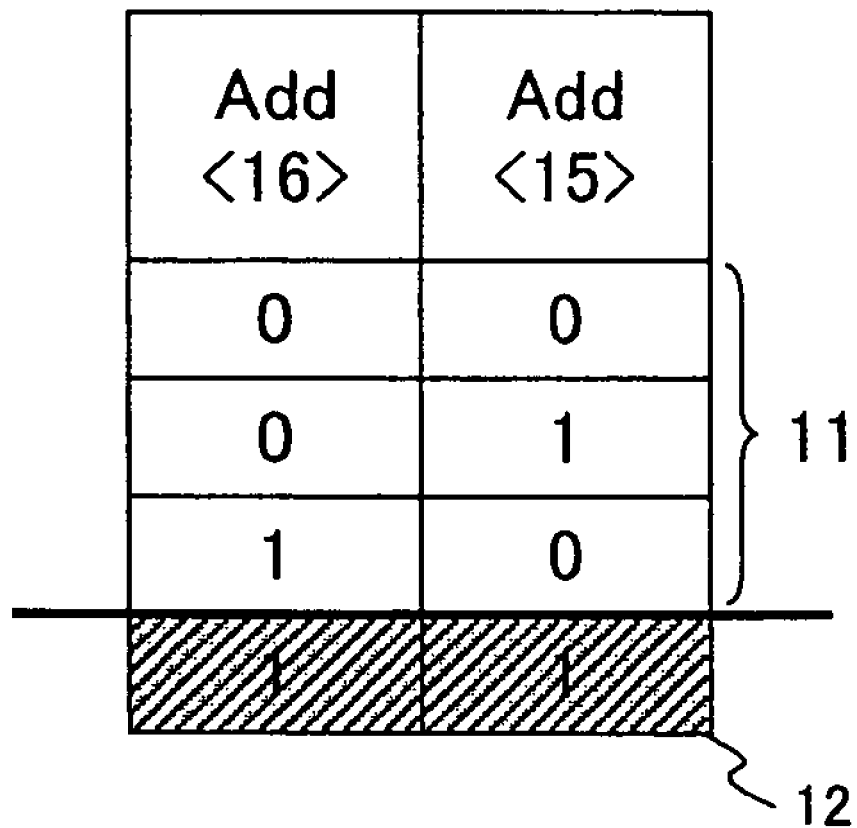
FIG. 1 shows a memory space used in graphics.

In the following explanation, it is assumed that, as an example of the memory system according to the present embodiment, the memory system is image memory having an address space from 00H to FFH, memory is implemented for an address space 11 from 00H to BFH as shown in FIG. 1, and memory is not implemented for an address space 12 for the upper ¼ of C0H to FFH. The memory system according to the present embodiment is not limited to above-mentioned address space. Although the memory is described as synchronous memory, but the memory according to the present embodiment can be asynchronous memory.

A command to change various internal settings in memory is called an MRS (mode-register-set) command.

According to the present embodiment, a special illegal command is not set as an MRS command, but an MRS command is recognized as, for example, an RD (read) command, etc. executed in normal read/write for the address space 12 for which memory is not implemented. (In the following example, a command is regarded as an MRS command when an RD command is executed on the address space for which memory is not implemented.) Practically, when an RD command is input with the address identification A<16:15>=(H, H) specified for the highest address A<16:15>, it is recognized as an MRS command.

In the above-mentioned explanation, an RD command is assigned to an MRS command, but it is not limited to an RD command, it can also be assigned to other commands such as a WT command, a Ref command, etc. However, in non-volatile memory, since a WT command is first executed and for a write, it is not necessary to guarantee data of an RD command and a Ref command input before the first WT command. Therefore, it is desired that a command other than a WT command such as an RD command, a Ref command, etc. is assigned to the MRS command.

FIG. 2 shows the status of each input terminal when an MRS command and an RD command are input.

As for the input of an MRS command, the input of /CE (chip-enable) is "L", the input of /WE (write-enable) is "H" as with the RD command. However, the address input is A<16:15>=(H, H) without the implementation of the real memory, and an address not used in the memory is specified. An RD command having a value other than the address input A<16:15>=(H, H) is recognized.

An MRS command selects and sets each set value in each operation mode with an address code 21a other than the A<16:15>. For example, the set value of RL is assigned to A<14:13> of the address code 21a, and the settings are input as RL=2 when A<14:13>=(L, H), and RL=4 when A<14:13>=(H, H). Independent of this process, the set value of BL is assigned to A<8:7> of the address code 21a. For example, the set values are input as BL=2 when A<8:7>=(L, H) is input, and as BL=8 when A<8:7>=(H, H).

When an MRS command is input, the real memory is not implemented for the address space of the simultaneously input address input. Therefore, there is no corresponding memory cell. As a result, no memory core operates.

When access starts to a memory cell without executing an MRS command, the memory operates in an operation mode based on the value set in advance as an initial value in the mode register (described later).

Described below is the method for preventing erroneous settings by an MRS command.

Figure 3:
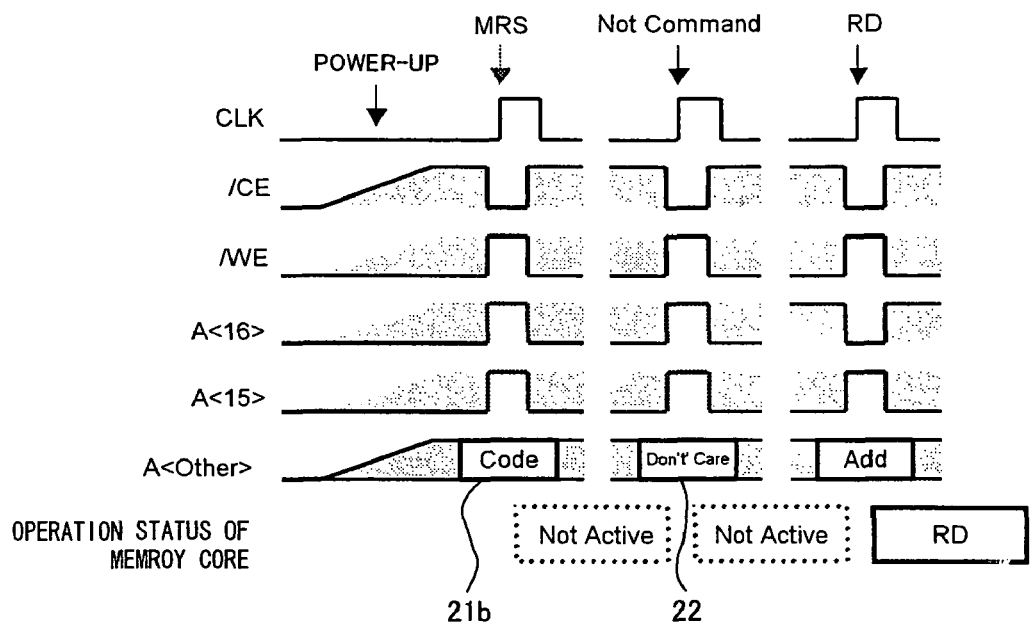
FIG. 3 shows the case where the MRS is performed only using the first RD command after power-up, after resetting initialization, or after recovery from low-power standby.

FIG. 3 shows the case in which an MRS command is executed only by the first RD command after power-up, after resetting initialization, or after recovery from low-power standby.

In FIG. 3, the first MRS command is accepted, and the settings are changed by an address code 21b. However, once an MRS command is input and accepted, the subsequently input MRS commands are not accepted, thereby preventing the switch of an operation mode by an accidental operation. Therefore, the settings are not changed by an address code 22 of the second MRS code.

As described above, the non-volatile memory such as DRAM, SRAM, etc. starts normal significant operations from a WT command. Therefore, when a WT command is input without address input, or when a command to designate an address at which a memory cell exists regardless of whether or not it is a WT command is input, and although no MRS command is accepted during the input, it is desired that no MRS command is accepted subsequently.

An example in which an RD command is assigned to an MRS command is explained above, but the same holds true when other commands are assigned.

The second method in which erroneous settings by an MRS command is avoided is explained below.

Figure 4:
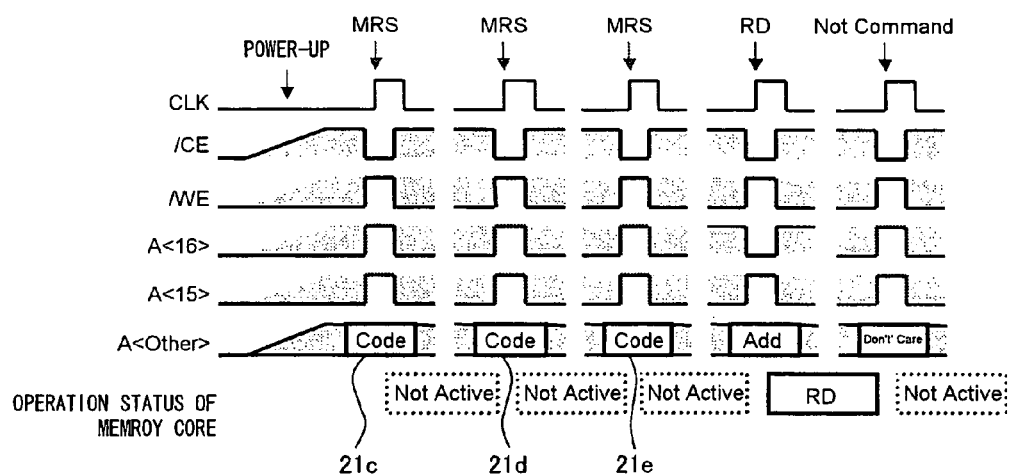
FIG. 4 shows the second method for preventing erroneous settings by an MRS command.

In the second method shown in FIG. 4, an MRS command is accepted until a command to an address at which a corresponding memory cell exists is input after power-up, after resetting initialization, or after recovery from low-power standby.

In the case shown in FIG. 3, only the first MRS command is valid, but all MRS commands input until the normal operation is started are valid.

By enabling plural MRS commands, resetting is permitted when an MRS command is accidentally set. In this case, the operation mode of memory depends on the set value by the last MRS command.

In the case shown in FIG. 3, the MRS command is input three times until the RD command is input. But, memory settings are changed by address codes $21c$, $21d$, and $21e$ input together with each MRS command, and a set value by the address code $21e$ is finally set.

In this method, when a command (other than the MRS command) to an address for which real memory exists is input, the subsequent MRS commands are disabled, thereby preventing an erroneous switch of an operation mode during normal memory access.

Next, the third method for preventing erroneous settings by an MRS command is explained.

Figure 5:
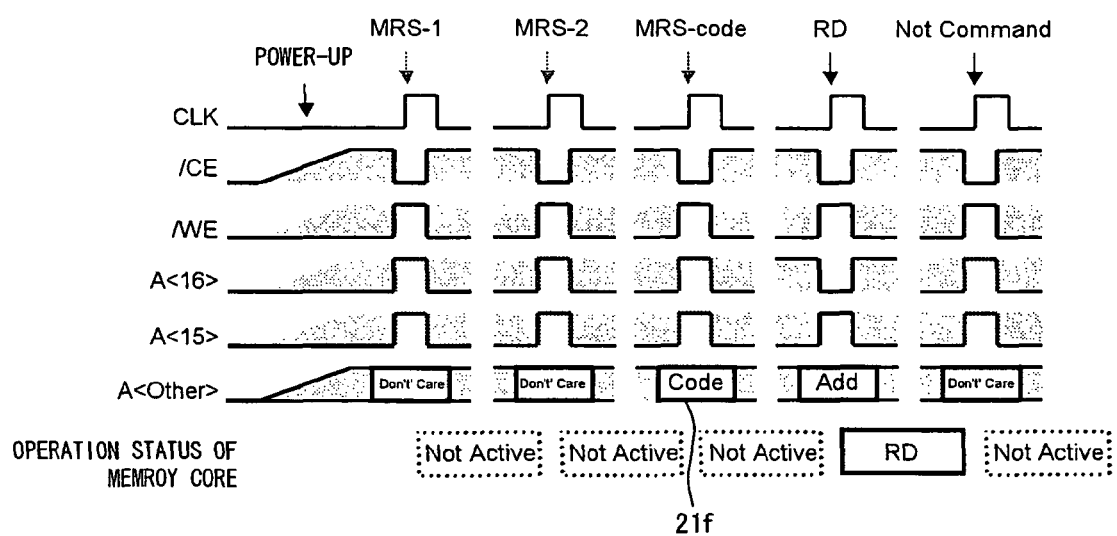
FIG. 5 shows the third method for preventing erroneous settings by an MRS command.

In the third method shown in FIG. 5, an MRS command is accepted and settings are changed when access to an address for which no memory cell exists is performed continuously three times, that is, when the MRS command is input continuously three times so that accepting the MRS command and changing the settings.

In this case, an operation mode is set based on an address code $21f$ input together with the third MRS command.

In FIG. 5, an MRS command is accepted when it is input continuously three times. However, the frequency is not limited to three times, but an MRS command can be input twice, or four times or more for an MRS command to be accepted.

As shown in FIG. 3, settings can be performed only by the third MRS command, and the fourth and subsequent MRS commands cannot be accepted. Otherwise, as shown by referring to FIG. 4, the settings can be changed by accepting any number of MRS commands after the third MRS command until the command specifying the address for which the real memory is implemented is input. The case shown in FIG. 5 relates to the latter case.

Explained below is the fourth method for preventing erroneous settings by the MRS command.

Figure 6:
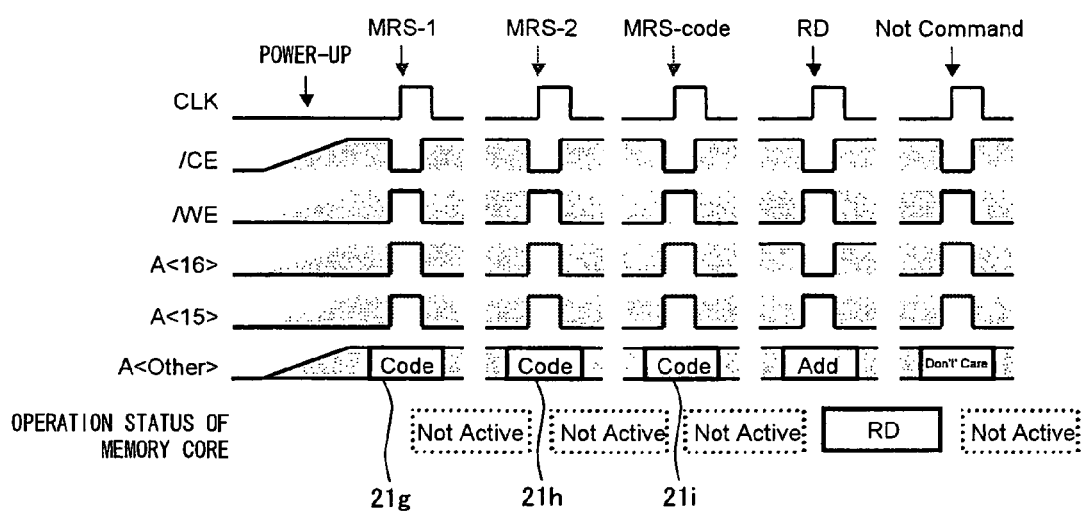
FIG. 6 shows the fourth method for preventing erroneous settings by an MRS command.

The fourth method shown in FIG. 6 is used to make it harder to accidentally set the operation mode than the third method shown in FIG. 5.

In the third method, when the MRS command is input plural times, the MRS command is accepted. However, in the fourth embodiment, an address code input together with plural times of the MRS command is compared with a predetermined value. When they match, the MRS command is accepted.

In the case shown in FIG. 6, when the values of address codes $21g$ and $21h$ input as address <14:1> simultaneously with the continuously input first MRS command (MRS-1) and the second MRS command (MRS-2) match a predetermined value, the settings of the operation mode are changed by an address code $21i$ input together with the third MRS command (MRS-code).

With the configuration shown in FIG. 6, as in the case of the third method shown in FIG. 5, restrictions are placed such that setting are performed only by the third MRS command, the fourth and subsequent MRS commands cannot be accepted, or any number of MRS commands can be accepted for and after the third MRS command until a command specifying an address for which real memory is implemented is input, thereby changing the settings.

In FIG. 6, all address codes other than the higher 2 bits are used in comparison with a specific value, but it is not necessary to use all bits of address code.

Next, the fifth method for preventing erroneous settings by an MRS command is explained below.

In the fifth method shown in FIG. 7, a plurality of MRS commands are set. They are set by defining as an MRS command the RD command specifying an address as an address code for which memory is not implemented in the first through fourth methods. However, in the fifth method, in addition, the WT command specifying an address as an address code for which memory is not implemented is defined as an MRS command. In this case, the former is set as an MRS-A, and the latter is set as an MRS-B.

In the fifth method, two MRS commands set different operation modes. For example, the MRS-A is a command to set an RL and a BL, and the MRS-B is a command to switch the capability such as various voltage levels, operation timing, etc. of an output transistor in a memory core.

In FIG. 7, by an address code $21j$ of the MRS-A as an MRS command by the RD command, an RL, a WL, a BL, etc. are set, and various capabilities of an internal transistor are switched by the address code $21k$ of the MRS-B as an MRS command by the WT command.

Described below is the configuration of the memory system according to the present embodiment.

FIG. 8 shows an example of the first configuration of the memory system according to the present embodiment.

The memory system according to the present embodiment comprises a memory controller $31a$ and memory $32a$.

The memory controller $31a$ comprises an address reception unit $33a$ for accepting an address code input from outside the device, and a command conversion unit $33a$ for generating and outputting an instruction cmd that can be interpreted by the memory $32a$ from an address code and an input value of the control signal such as /WR, /CE, etc. For example, when an RD instruction specifying an address code for an address space for which real memory is not implemented as described above, the command conversion unit $33a$ converts the instruction into an MRS command as an instruction that can be interpreted by the memory $32a$.

The memory $32a$ has a portion not corresponding to a memory cell for all address space such as graphic memory, etc., and provided with a latch & command decoder $35a$, a Din/Dout controller $36a$, a mode register $37a$, a mode controller $38a$, and a memory core $39a$.

The latch & command decoder $35a$ latches and decodes the instruction cmd from the memory controller $31a$, controls a read/write of data to the memory core $39a$ based on a decoding result, and writes data to the mode controller 38a. The Din/Dout controller 36a writes the write data received from the memory controller 31a to the memory core 39a, or outputs the data read from the memory core 39a to the memory controller 31a. The mode register 37a changes the value set in the mode register 37a using the register in which various settings in the memory 32a are set, thereby changing various internal settings such as RL, BL, etc. in the memory. The mode controller 38a controls the memory core 39a, etc. based on the value set in the mode register 37a, and realizes a change of various internal settings. The memory core 39a comprises a memory cell array, a sense amplifier, etc., and data is read from and written to a cell in a specified position by an address code.

With the configuration shown in FIG. 8, various operations according to the present embodiment are realized by connecting the memory controller 31a to the memory 32a.

Figure 9:
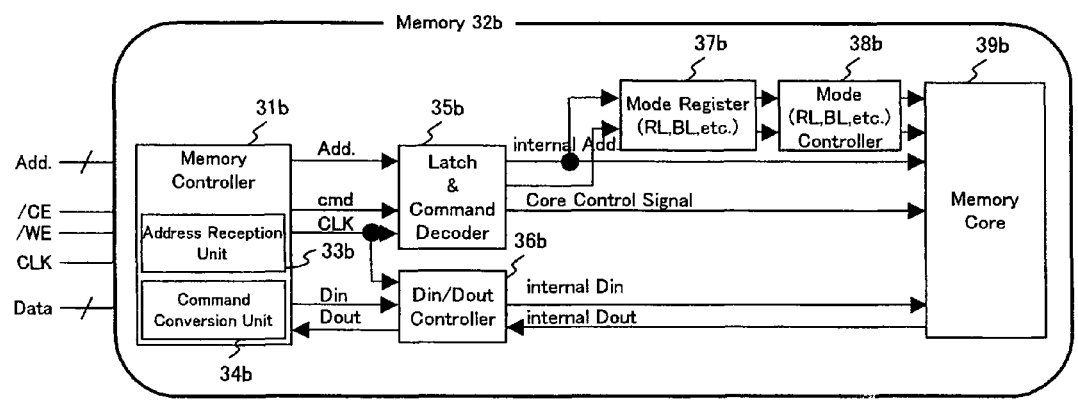
FIG. 9 shows an example of the second configuration of the memory system according to an embodiment of the present embodiment.

FIG. 9 shows the second example of the configuration of the memory system according to the present embodiment.

The second example of the configuration shown in FIG. 9 shows a memory controller 31b built in memory 32b.

The configuration shown in FIG. 9 includes the memory controller 31b, an address reception unit 33b, and a command conversion unit 33b. The memory controller 31b basically performs the same operation as the memory controller 31a shown in FIG. 8.

The latch & command decoder 35a, a Din/Dout controller 36b, a mode register 37b, a mode controller 38b, and a memory core 39b are the same as those in the basic configuration and operations shown in FIG. 8.

With the configuration, since the memory controller 31b is built in the memory 32b, various operations according to the present embodiment can be realized without newly and externally attaching a device to the memory 32b.

Figure 10:
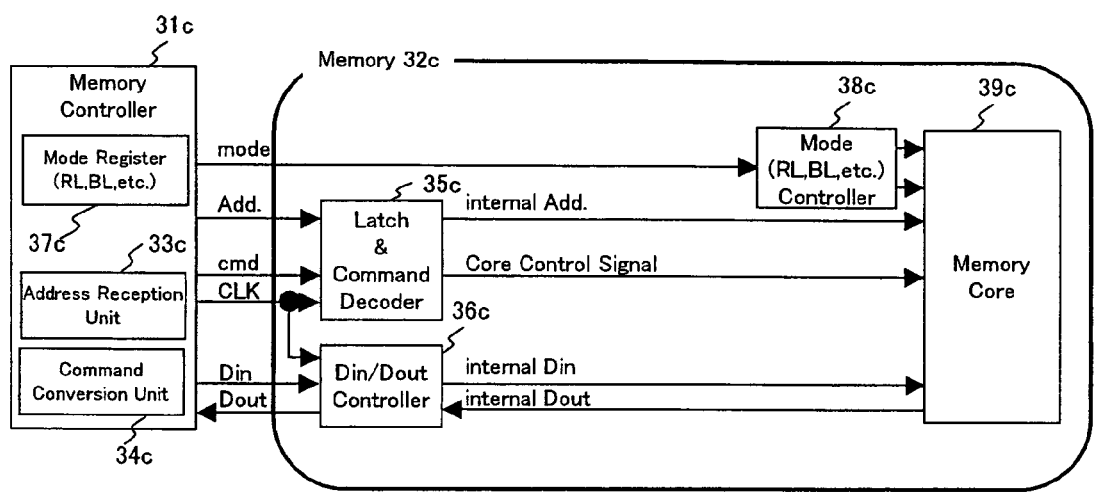
FIG. 10 shows an example of the third configuration of the memory system according to an embodiment of the present embodiment.

FIG. 10 shows the third example of the memory system according to the present embodiment.

The third example of the configuration shown in FIG. 10 is obtained by changing the configuration shown in FIG. 8 by providing a mode register 37c not in memory 32c but in memory controllers 31. In this case, a signal indicating an operation mode is passed from the memory controller 31c to the memory 32c. The signal indicating an operation mode can be a decoded signal, but a configuration can be designed to reduce the number of mode signals to be communicated between the memory controller 31c and the memory 32c by including a decoder in the memory 32c.

With the configuration, the memory 32c having no memory controller 31c and mode register 37c can be dealt with.

Figure 11:
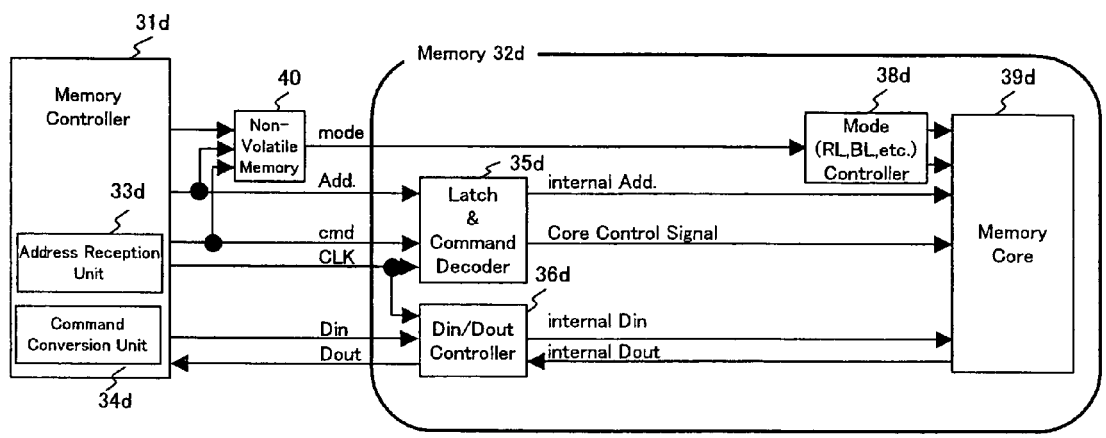
FIG. 11 shows an example of the fourth configuration of the memory system according to an embodiment of the present embodiment.

FIG. 11 shows the fourth example of the configuration of the memory system according to the present embodiment.

In the fourth example of the configuration shown in FIG. 11, each of memory controller 31d and memory 32d has no mode register, but has non-volatile memory 40 outside the memory controller 31d and the memory 32d.

The non-volatile memory 40 has basically the same function as mode registers 37 (37a through 37d) shown in FIGS. 8 through 10. With the configuration shown in FIG. 11, since the function of the mode registers 37 is realized by the non-volatile memory 40, the once set internal settings of the BL, RL, etc. remain as is even after the power is applied again, it is not necessary to set again the settings each time activation is performed.

The memory 32a, 32c, and 32d connected to the memory controllers 31a, 31c, and 31d can be a general-purpose memory device.

FIG. 12 shows an example of the configuration of a graphic controller shown as another embodiment of the memory system according to the present embodiment.

The memory system according to the present embodiment is not limited to the configuration only by memory controllers 31 and memory 32 as shown in FIGS. 8, 10, and 11, but can be the configuration including another peripheral device such as the graphic controller shown in FIG. 12.

A graphic controller 41 shown in FIG. 12 comprises in addition to a memory controller 43 and memory 44 a graphic core 42 for generating a video signal by processing input data, a clock generator 45 for generating an internal clock of the graphic controller 41, a video interface 46 for inputting/outputting a video signal, and an external bus interface 47 for connection with the bus of the information processing device.

In the case with the configuration, since the memory 44 is memory for graphics, the real memory is assigned to an address space of a multiple of 3.

In the graphic controller 41, when the internal settings of the memory 44 are to be changed, a command is transmitted to the memory controller 43 with an address space not yet assigned real memory specified, thereby changing the internal settings of an RL, BL, etc.

The graphic controller can have various configurations depending on the purpose of use and use environment, and the configuration shown in FIG. 12 is only one example.

In the explanation above, memory for graphic use is assumed, and real memory is assigned to an address space of a multiple of 3. However, the memory system according to the present embodiment is not limited to this configuration, but can have any configuration so far as there is a portion in which real memory is not implemented for an address space.

In the explanation above, the memory used for a memory system is DRAM, but other memory such as SRAM, etc. can be applied.

What is claimed is:

1. A memory controller connected to memory, comprising:
   an address reception unit receiving an address code externally input together with a command; and
   a command conversion unit outputting to the memory an MRS command to change internal settings of the memory based on the address code when the address code input together with a first command specifies an address space for which the memory is not implemented,
   wherein the command conversion unit outputs the MRS command to the memory when the first command is input N times (N is a natural number equal to or larger than 2) continuously together with the address code specifying an address space for which the memory is not implemented,
   wherein the command conversion unit outputs the MRS command to the memory when the address code input together the first N−1 times is a predetermined value in the first commands input N times continuously.

2. The memory controller according to claim 1, wherein the first command is a read command.

3. The memory controller according to claim 1, wherein the command conversion unit outputs to the memory an MRS when the address code input together with a second command different from the first command specifies an address space for which the memory is not implemented.

4. The memory controller according to claim 3, wherein the first command is a read command, and the second command is a write command.

* * * * *